United States Patent
Hammond

(10) Patent No.: US 6,435,328 B1
(45) Date of Patent: Aug. 20, 2002

(54) GRAVITY-ADVANCE CONVEYOR FOR PALLET LOADS

(76) Inventor: Theodore A. Hammond, 1703 Roberts Landing Rd., Windermere, FL (US) 34786

( * ) Notice: Subject to any disclaimer, the term of this patent is extended or adjusted under 35 U.S.C. 154(b) by 0 days.

(21) Appl. No.: 09/921,631

(22) Filed: Aug. 3, 2001

(51) Int. Cl.[7] .............................................. B65G 13/00
(52) U.S. Cl. ................................. 193/35 SS; 193/35 A
(58) Field of Search ........................... 193/35 A, 35 SS

(56) References Cited

U.S. PATENT DOCUMENTS

| | | | |
|---|---|---|---|
| 3,439,790 A | * 4/1969 | Langley et al. | 193/35 SS X |
| 4,044,876 A | 8/1977 | Hammond | 193/35 SS |
| 4,205,740 A | 6/1980 | Hammond | 193/35 A |
| 4,304,521 A | 12/1981 | Hammond | 193/35 SS |
| 4,887,937 A | * 12/1989 | Trunnissen | 193/35 SS X |
| 5,350,048 A | * 9/1994 | Wylie | 193/35 SS X |
| 5,605,427 A | * 2/1997 | Hammond | 193/35 SS X |

* cited by examiner

Primary Examiner—James R. Bidwell
(74) Attorney, Agent, or Firm—Flynn, Thiel, Boutell & Tanis, P.C.

(57) ABSTRACT

A conveyor provided with a sidewardly spaced pair of elongate roller systems which are downwardly inclined and are maintained in rolling engagement with legs associated with outer edge portions of a pallet. A conveying arrangement extends longitudinally midway between the roller systems and includes a vertically movable roller unit actuatable so that, when raised upwardly the rollers engage and lift a center portion of the pallet to permit gravity-urged movement downwardly along the conveyor. The roller unit, when lowered, permits the center portion of the pallet to engage a stationary brake structure.

15 Claims, 6 Drawing Sheets

GRAVITY-ADVANCE CONVEYOR FOR PALLET LOADS

FIELD OF THE INVENTION

This invention relates to a conveyor for a storage and advancing system for loads, particularly palletized loads, and more specifically relates to an improved activating and controlling arrangement for effecting controlled movement and stopping of palletized loads by utilizing deflection of the pallet to assist in controlling the movement and stoppage thereof.

BACKGROUND OF THE INVENTION

Conveying and storing arrangements are extensively utilized in warehouses, factories and the like for permitting storage and advancing of loads, particularly palletized loads, to a discharge or load-removal station. Gravity-type arrangements are particularly desirable in that they eliminate the need for complex powered driving or advancing mechanisms for the loads, and such gravity systems typically provide a horizontally elongate support track which extends at a slight incline relative to the horizontal to provide for controlled advancing movement of the loads downwardly along the track. Such systems permit storage of significant numbers of palletized loads in a "first in—first out" system, that is, the loads are positioned on the conveyor system at the upper input end thereof, and are then advanced by gravity downwardly along the slight incline for removal at the other or output end, whereby the oldest load on the conveyor system is the first to be removed.

Systems of the above type have been widely adopted and used for many years, and one example of a system which has met with significant acceptance is illustrated in my U.S. Pat. Nos. 4 205 740 and 4 304 521.

My earlier system is frequently utilized as a first in—first out storage rack and, as diagrammatically illustrated in FIGS. 1–2, includes a generally upright framework 11 which typically defines a plurality of horizontally elongate bays disposed vertically one above another within a column, with a plurality of such columns being typically disposed in side-by-side relation. A storing and gravity-type conveying system 12 is associated with and extends lengthwise along each bay.

The system 12 is independently controlled, and one end 13 thereof defines an input end for accommodating loads, typically palletized loads, and the other end 14 functions as the output or discharge end. A conventional stop device 15 is provided at the output end for engaging the lead load so that removal of the lead load from the storage rack is normally accomplished utilizing a lift device such as a fork lift or other conventional mechanism.

The storage and conveying system 12 includes a substantially identical pair of elongate and generally parallel storing and conveying assemblies 21 which are disposed in sidewardly spaced relationship, and extend lengthwise from the input end 13 so as to terminate at the output end 14. The assemblies 21 extend at a slight decline as they project from the input to the output end, which decline is a small acute angle relative to the horizontal, typically 15° or less.

Each storing and conveying assembly includes an elongate track 22 which is rigidly mounted on the frame and extends lengthwise of the bay. The track in the illustrated and preferred construction is formed as an upwardly-opening channel member defined by a bottom wall 23 which extends between and rigidly joins to upwardly projecting and generally parallel side walls 24, whereby the channel member defines therein an upwardly opening channel 25 which extends lengthwise along the track 22. At least one of the track side walls 24 has a support flange 26 fixed to the upper edge thereof and projecting transversely, preferably perpendicularly, outwardly away from the channel 25. In the preferred arrangement a similar said support flange 26 is associated with and projects outwardly from the upper edge of each track side wall 24. The support flanges 26 define thereon generally flat and planar upper surfaces 27 which function as storage and braking surfaces, as explained below. At least one of the support flanges 26, namely the flange which is outermost or remote from the other track 22, is also provided with a further flange 28 which angles upwardly from the outer edge of the respective support flange 26 and hence defines thereon an upper surface 29 which is inclined relative to both the horizontal and vertical, and functions as a load centering surface, as explained hereinafter.

The track 22 associated with each storing and conveying system 21 also has an elongate roller assembly 31 which is disposed and extends lengthwise of the track and is vertically movable relative to the track. This roller assembly 31 includes an elongate support channel 32 which is sized so as to be disposed horizontally between and vertically movable relative to the side walls 24 of the respective track 22. This support channel 32 opens upwardly and has a plurality of support wheels or rollers 33 positioned therein in closely spaced relationship longitudinally throughout the length of the support channel. The rollers or wheels 33 are each disposed for rotation about a respective horizontal axis which extends perpendicularly between the side walls of the support channel 32, whereby the rollers 33 are supported for rotation about axes which are perpendicular to the elongated direction of the respective conveying arrangement and bay. The wheels or rollers 33 are disposed with their upper portions positioned at an elevation slightly above the upper edge of the support channel 32.

The roller assembly 31 is in turn supported on a lifting mechanism 35 which is disposed within the bottom of the main track 22 so as to be confined between the bottom walls of the track 22 and the support channel 32. The lifting device 35 typically comprises an elongate pneumatically-inflatable hose 36, commonly referred to as a fire hose, which extends lengthwise of the track 22 and, when at least partially inflated causes upward lifting of the roller assembly 33, and when at least partially deflated causes lowering of the roller assembly 33. The lifting and lowering of the roller assembly 33 by inflation/deflation of hose 36 is such as to cause the upper profiles of the rollers 33 to be moved between a raised load-engagement position wherein the upper roller profiles are at least slightly above the plane of the brake surfaces 27, and a lowered position wherein the upper profile of the rollers 33 is at or slightly below the plane of the brake surfaces 27. The inflation and deflation of the hose 36 is by a suitable pressure and control arrangement 37 which is well known, one example being described in my earlier '740 patent, so as to cause the hose 36 to be inflated and deflated in a cyclic or pulsing manner to hence provide for desired control over the gravity-urged movement of loads downwardly along the storing and conveying system.

The loads stored on and moved along the storing and conveying apparatus are typically palletized loads 41, each of which includes a plurality of individual articles disposed on and secured to a pallet 42, such as by a shrink-wrap securement. The pallet typically has edge and center skids or runners projecting downwardly therefrom, which runners are frequently secured to a bottom deck or platform. The edge runners (or the bottom deck if present) are typically disposed for direct supportive engagement with either the rollers 33 or the support surfaces 27.

In operation, when the roller assembly 31 is in its lowered position due to a deflated state of the hose 36, the edge runners bear directly on the support surfaces 27 to maintain the load 41 stationary. Upon inflation of the hose 36, the roller assemblies 31 are moved upwardly so that the rollers 33 engage the pallet runners (or bottom deck) and lift them slightly upwardly from the support surfaces 27, whereupon the gravity-induced force on the pallet downwardly along the conveying system causes the palletized load to advance forwardly due to rotation of the rollers 33. The forward advance will continue until the hose 36 is again deflated, causing the roller assemblies 31 to lower and thus cause the runners to again engage the braking and storing surfaces 27. During the lowering of the palletized load, if the load tends to move longitudinally off center, then the outer edge of the runner may engage the inclined centering surface 29 to thus effectively sidewardly displace and hence effect recentering of the palletized load during the lowering thereof.

While the system described above has proven to provide a highly desirable and successful mode of operation, nevertheless Applicant in a continuing effort to improve on this system has been able to determine that improvements can be made with respect to the overall mechanics as well as the structural and operational simplification thereof, particularly in light of the changing design requirements associated with different types of loads such as those loads employing new lighter weight pallets such as plastic pallets.

More specifically, it is an object of this invention to provide an improved storing and conveying system and process for palletized loads, particularly those loads employing deflectable pallets, whereby only a single activating roller system is required for extension lengthwise along the storage and conveying bay, with the storing and conveying system cooperating generally with the longitudinal center of the pallet and utilizing upward and downward deflection thereof so as to control the moving and stopping thereof, whereby the longitudinal side edge portions of the pallet may at all times remain in proper engagement with support surfaces such as freely rotatable conveyor wheels or rollers.

In the improved system of this invention, as aforesaid, only a single elongate activating mechanism is required for each conveyor or bay, thereby simplifying the number of moving parts as well as the air and/or power requirements, and at the same time permitting the edge portions of the loaded pallet to more easily remain properly engaged with conveyor rollers which are not subject to elevational changes so as to provide for desired load stability.

In the storing and conveying system of the present invention, according to a preferred embodiment thereof, there is provided a sidewardly spaced pair of elongate freely-rotatable roller systems which extend at a slight downward incline and which are maintained in continuous supportive and rolling engagement with the underside of the stringers or legs associated with the longitudinal outer edge portions of the pallet. A single storing and conveying arrangement extends longitudinally generally midway between the pair of conveyor tracks, and cooperates with the longitudinally extending center stringer or legs of the pallet. The storing and conveying arrangement includes a support track having a stationary storage surface for engagement with the lower surface of the stringer or pallet legs to maintain the pallet stationary. The support track also has a roller unit vertically movably mounted thereon and actuatable so that, when raised upwardly the rollers engage the pallet and lift the center portion of the pallet to lift the longitudinally center stringer or legs out of engagement with the support track so as to permit gravity-urged movement of the pallet downwardly along the conveyor arrangement until the lifting mechanism again lowers the center roller assembly. The lifting and lowering arrangement takes advantage of the deflection capability of the center portion of the pallet so that the longitudinal center portion is deflected upwardly by the center roller mechanism when in a moving condition, and when the center roller mechanism is lowered the center longitudinal portion of the loaded pallet deflects downwardly so that the center stringer or legs reengage the support surface. During this upward or downward deflection of the pallet, however, the longitudinal edge portions of the pallet remain in supportive engagement with the pair of side conveyor roller systems.

Other objects and purposes of the present invention will be apparent to persons familiar with arrangements of this general type upon reading the following specification and inspecting the accompanying drawings.

Figure 1:
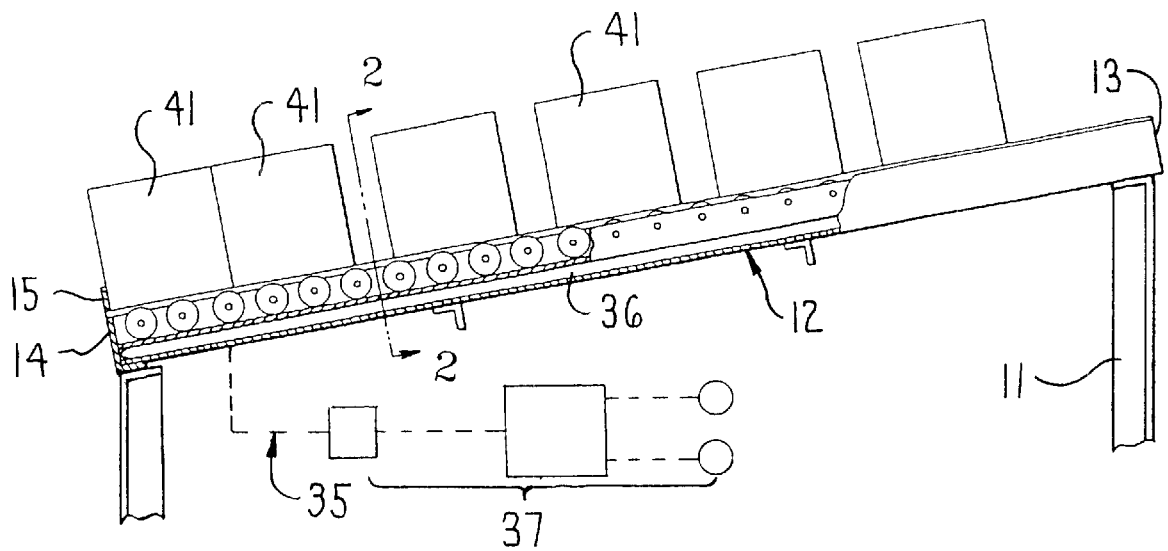
FIG. 1 is a side elevational view of my prior storage and conveying system.

Certain terminology will be used in the following description for convenience in reference only, and will not be limiting. For example, the words "upwardly", "downwardly", "rightwardly" and "leftwardly" will refer to directions in the drawings to which reference is made. The words "upwardly" and "downwardly" will also be used to refer to the normal direction of movement of the conveyor and of associated parts. The words "inwardly" and "outwardly" will also refer to directions toward and away from, respectively, the geometric center of the arrangement and designated parts thereof. Said terminology will include the words specifically mentioned, derivatives thereof, and words of similar import.

DETAILED DESCRIPTION

Referring to FIGS. 3–6, there is illustrated an improved conveyor 51 according to the present invention for permitting storage of loads thereon, with the loads being advanced longitudinally along the conveyor from one end (i.e. an input end) to the other end (i.e. an output end) so as to provide for "first infirst out" storage of loads.

The conveyor 51 includes a stationary frame 52 on which a conveyor system 53 is supported, the latter supporting thereon loads which are typically palletized loads. The load is diagrammatically depicted by a pallet 54 as illustrated in dotted lines.

The pallet 54 includes a top support deck or platform 55 which has a plurality of support runners fixed to the underside thereof, including a runner 56 extending along one side of the deck, a further runner 57 extending along the other side of the deck, and a still further runner 58 positioned midway between runners 56 and 57, whereby the runner 58 is disposed generally along the centerline of the deck in one of the transverse dimensions thereof. The runners may be elongated to extend along the length of the deck or, as depicted by the illustrated embodiment, may be defined by a plurality, here three, of legs disposed in spaced relation along a longitudinally extending row. A pallet of any construction similar to the pallet 54, as described above, is provided solely with a top deck for supporting loads thereon, and is not provided with a parallel bottom deck. Pallets of this type are conventionally constructed of plastics materials, with the top deck being defined by upper and lower sheets bonded to an intermediate layer such as a plastic honeycomb layer, and with the legs also being of molded plastics material bonded to the bottom surface of the top deck.

The conveying system 53 of this invention includes a pair of side load-supporting conveyor sections 61 and 62 which are positioned in generally parallel but sidewardly spaced relationship so as to be disposed for supportive engagement with the respective rows of pallet legs 56 and 57. The load-supporting conveyor sections 61 and 62 are substantially identical to one another, and thus the following description will apply to each.

Figure 3:
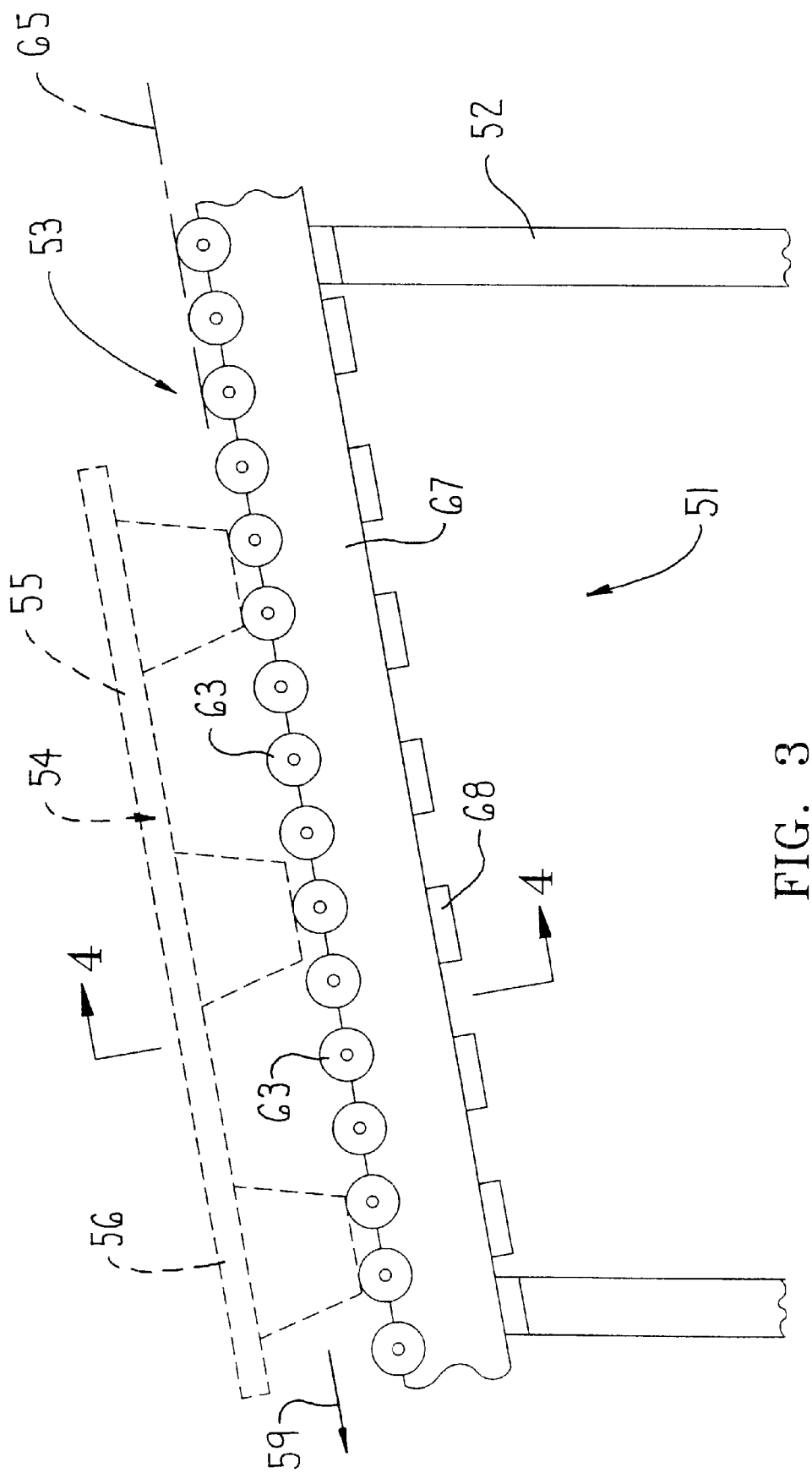
FIG. 3 is a fragmentary, side elevational view of the improved storing and conveying arrangement of the present invention.

The conveyor sections 61 and 62 each includes a plurality of non-powered rollers or rollers 63 disposed within a generally aligned row which extends in the lengthwise direction of the conveyor, which lengthwise direction corresponds to the direction of load movement as indicated by the arrow 59 in FIG. 3. The rollers 63 are supported for rotation about their respective axes 64, the latter being defined by support axles 66, which axles extend generally horizontally in substantially perpendicular relationship to the movement direction 59, with the axles being disposed in generally parallel but spaced relationship relative to the movement direction 59. The axles 66 support the rollers 63 such that the row of rollers 63 associated with each conveyor section 61 and 62 hence defines a line 65 which tangentially contacts the upper portions of the rollers 63, with the tangent lines 65 which contact the rows of rollers 63 associated with the conveyor sections 61 and 62 being disposed in sidewardly spaced but parallel relationship so as to effectively define a load plane, which plane defines the contact region with the pallet legs 56 and 57.

The axles 66 support the rollers 63 on stationary side members 67, such as channel members, which members in turn are fixedly supported on stationary frame members 68 which extend between and rigidly join the side members 67 associated with the conveyor sections 61 and 62. The side members 67 protrude upwardly through a lesser height than the rollers 63 so that upper portions of the rollers 63 are exposed so as to permit engagement with the bottom surfaces of the pallet legs.

The conveying system 53, in addition to the conveyor sections 61 and 62 described above, also includes a center load-activating conveyor section 71. The load-activating conveyor section 71 is disposed sidewardly substantially midway between the load-supporting conveyor sections 61 and 62, and all of the conveyor sections 61, 62 and 71 extend in generally parallel relationship and angle downwardly at a small acute angle from the horizontal (typically 15° or less) as they extend from an input end (rightward end in FIG. 3) to an output end (leftward end in FIG. 3) for permitting forward advancing of the loaded pallets toward the output end of the conveyor.

The load-activating conveyor section 71 includes an elongate rollererway 72 which extends lengthwise along the conveying system 53 and is movably positioned within a stationary confinement structure 73, the latter being illustrated as an elongate upwardly-opening channel having a bottom wall 74 fixedly secured to the cross frame members 68. The channel 73 has generally parallel side walls 75 which project upwardly for sidewardly confining the rollerway 72 therebetween.

The rollerway 72 is vertically movable in a reciprocating (i.e., up-and-down) manner by a reciprocating activating device 76. The reciprocating device 76, in the illustrated and preferred embodiment, includes an elongate inflatable conduit or hose 76 which is disposed within and extends lengthwise along the confinement channel 73, with the hose being supported on the bottom wall 74 thereof. The hose 76 in turn is positioned for supportive engagement with the bottom wall of the rollerway 72.

The rollerway 72 includes a plurality of non-powered rollers or wheels 81 which are disposed in longitudinally spaced relationship so as to define an elongate row which extends lengthwise of the conveyor. In the illustrated and preferred embodiment the rollers 81 are disposed in two sidewardly adjacent rows, with the individual rollers in the adjacent rows being longitudinally staggered or offset so as to provide more stable contact with the pallet, such general construction of conveyor rollers being well known.

The individual rollers 81 are rotatable about respective axes 82 which are defined by support axles, the latter being supported on an elongate support member 83, the latter in the illustrated embodiment being defined by an elongate upwardly-opening channel. The channel 83 includes a bottom wall 84 which is disposed in supportive engagement with the inflatable hose 76, and the bottom wall joins to lower ends of upwardly projecting and generally parallel side walls 85, the latter functioning as supports for the ends of the axles 82 so that the roller axes extend in generally parallel relationship with one another and extend horizontally in perpendicular relationship to the lengthwise direction of movement 59.

Figure 5:
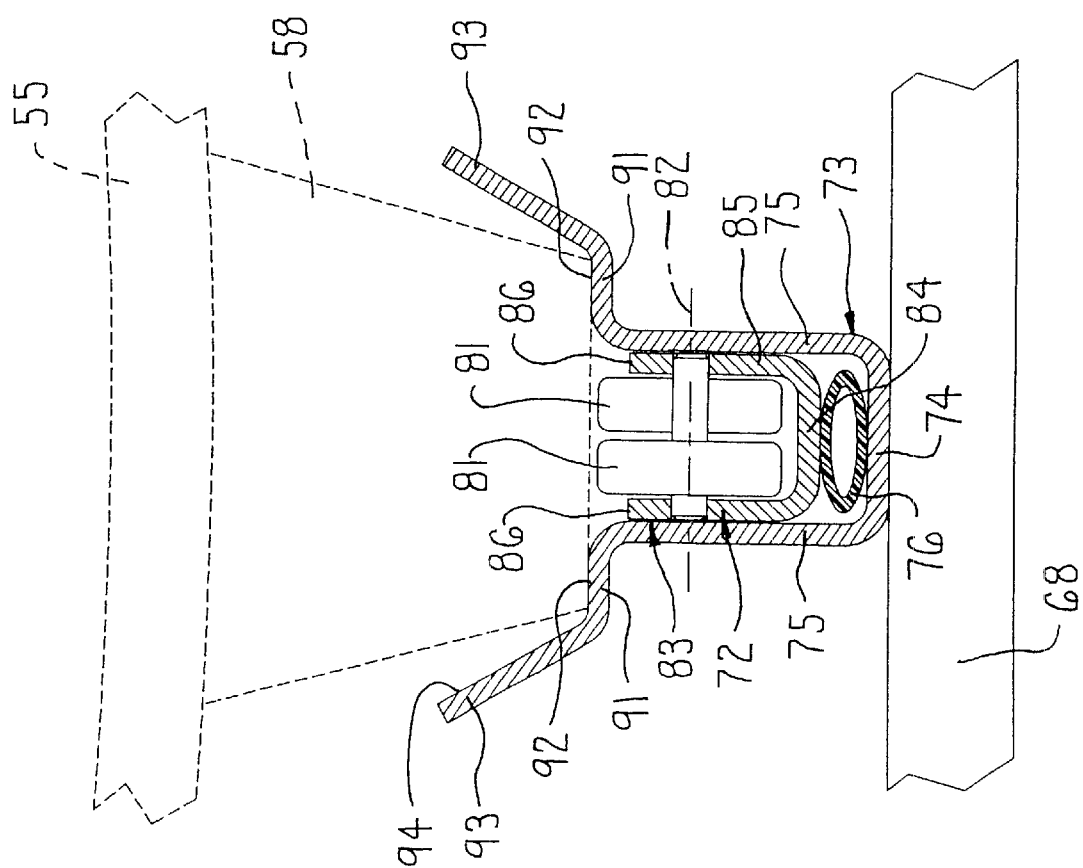
FIG. 5 is an enlarged, fragmentary sectional view showing only part of the arrangement of FIG. 4.

As illustrated in FIG. 5, the support channel 83 for the rollerway 72 is confined for vertical reciprocating movement generally within the interior of the stationary confinement channel 73, and these channels are suitably connected so as to permit the desired reciprocating movement of the rollerway 72. For example, the channel 83 typically mounts thereon a plurality of fixedly mounted pins which are disposed in longitudinally spaced relationship along the channel and protrude outwardly from the side walls, whereby the ends of the pins protrude into vertically elongated slots (not shown) formed in the side walls 75 of the channel 73 for providing control over the reciprocating vertical displacement of the rollerway 72.

The side walls 85 of channel 83 terminate in upper edges 86 which are disposed slightly below the upper portions of the rollers 81. The rollers 81 define a line or plane 87 which is tangent to the upper portions of the rollers 81 defining the row, with this tangent plane 87 being generally parallel with the load plane 65 defined by the load-supporting conveyor sections 61 and 62.

The load-activating conveyor section 71 also has brake members 91 associated therewith and positioned for braking engagement with the center runner or legs 58 of the pallet 54. The brake members 91 in the illustrated and preferred embodiment are defined by generally flat flanges which are fixedly joined to upper ends of the channel side walls 75, with the flanges 91 extending lengthwise along the channel 73 and projecting horizontally sidewardly in an outward direction from the respective side wall 75. Each flange 91 defines thereon a generally flat upper surface 92 which extends lengthwise along the center conveyor section 71 and functions as a braking surface. The braking surfaces 92 defined by the flanges 91 are disposed on opposite sides of the rollerway 72 and extend lengthwise thereof, and the sideward dimension (i.e. width) of the rollerway and the resulting sideward spacing between the brake flanges 91 is preferably less than the width of the bottom surface 99 of the center runner or legs 58 so that the bottom surface 99 can be engaged with the sidewardly spaced braking surfaces 92 as illustrated in FIGS. 4–5.

The brake flanges 91, in the illustrated and preferred embodiment, are also provided with flanges 93 joined to the outer longitudinally-extending edges thereof, which flanges 93 are cantilevered upwardly and sloped outwardly. The flanges 93 function as centering flanges in that they project upwardly so as to effectively sidewardly straddle but are normally sidewardly spaced from the center legs 58. These centering flanges 93 prevent the pallet 54 from significant sideward misalignment or displacement, and effect partial automatic re-centering of the pallet during lowering of the center legs, as described hereinafter.

The provision of the centering flanges 93 is optional, and such flanges can be eliminated if desired or if considered unnecessary. Alternatively, the flanges 93 can be associated with outer edges of the outer side members 67 as associated with side conveyor sections 61 and 62 so as to permit direct cooperation with the outer edges of the side legs or runners of the pallet.

Figure 4:
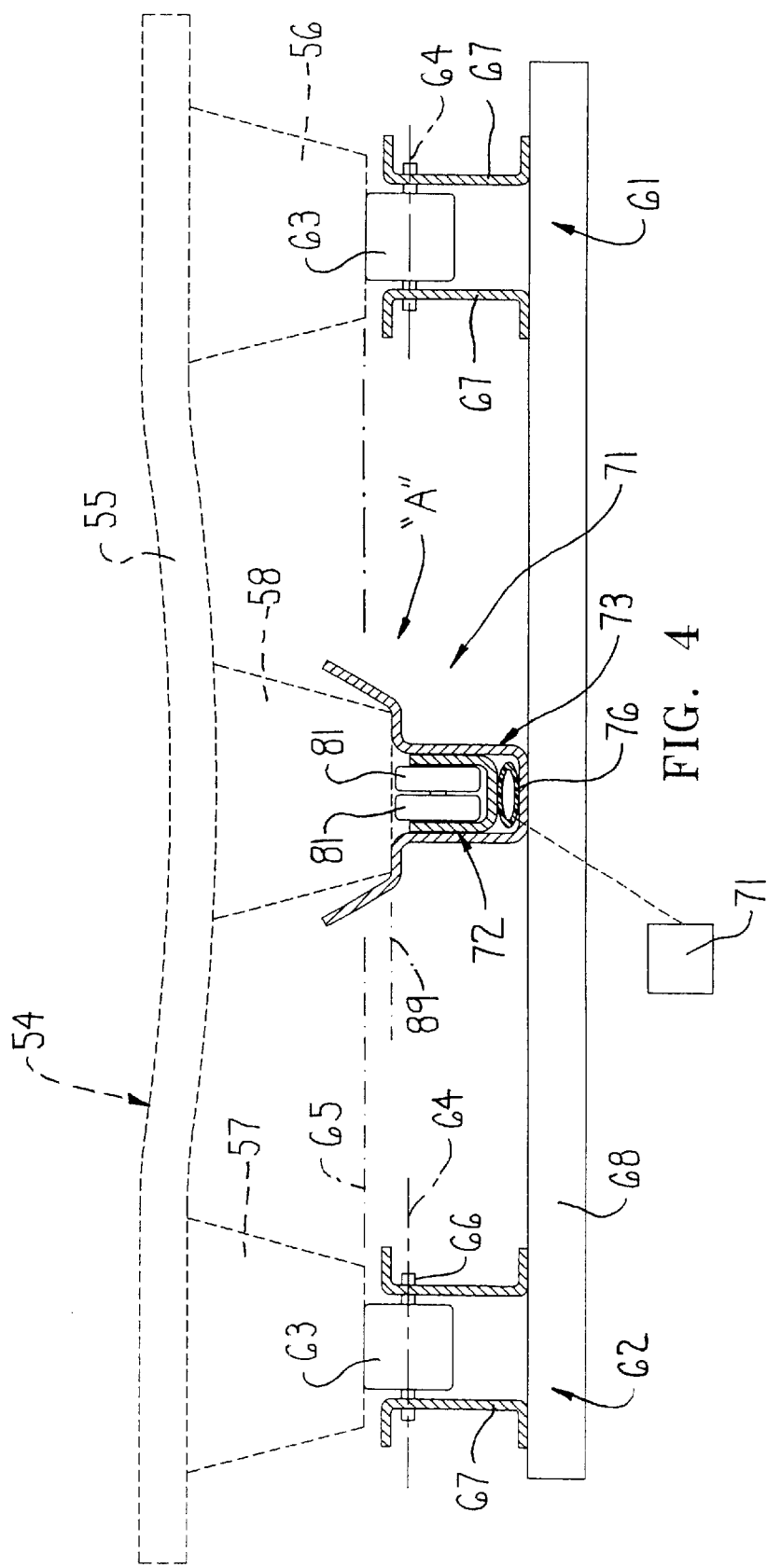
FIG. 4 is an enlarged fragmentary sectional view taken along line 4—4 in FIG. 3.
Figure 6:
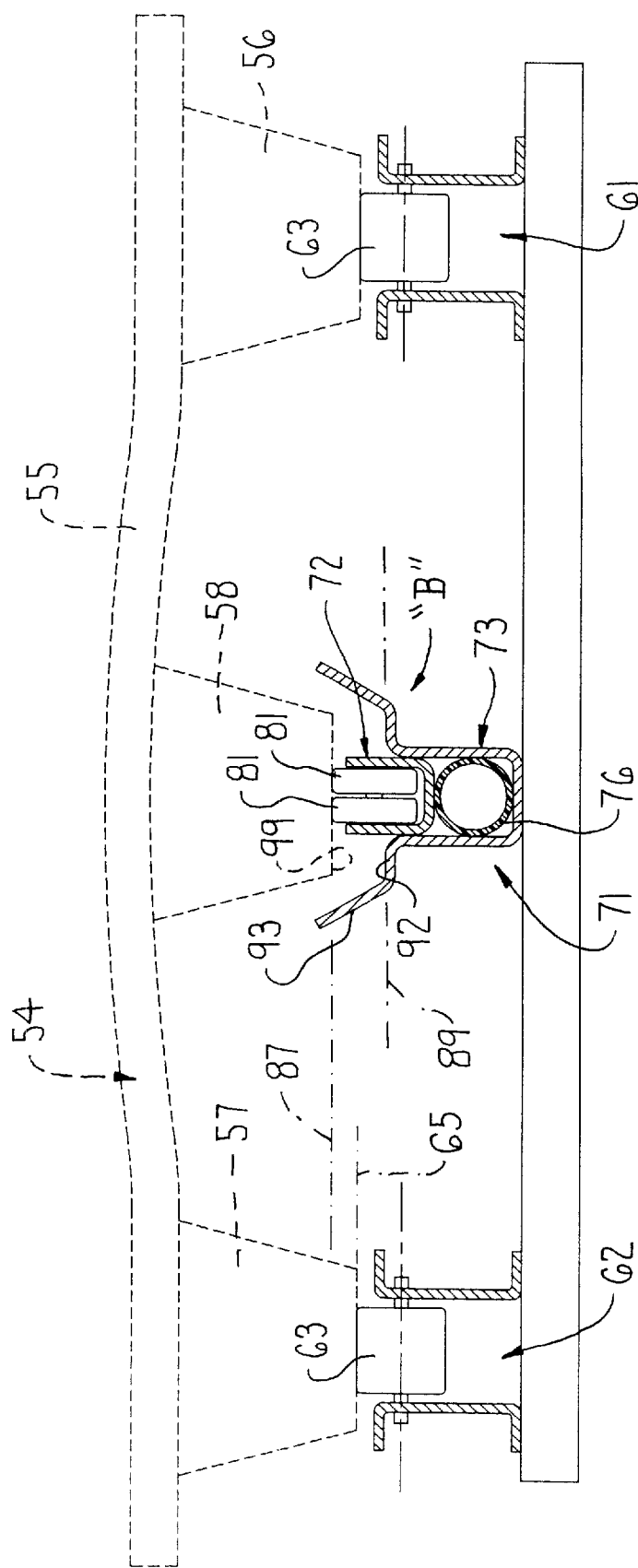
FIG. 6 corresponds to FIG. 4 but shows the pallet in a raised position.

The rollerway 72 is vertically activated and more specifically vertically reciprocated by partially inflating and deflating the hose 76 in a cyclic manner, thereby causing the rollerway 72 to be moved between an upper or activating position "B" as illustrated in FIG. 6, and a lowered non-activating position "A" as indicated in FIG. 4. The activating or upper position B of the rollerway results in the upper portions of the rollers 81 projecting above the plane 89 defined by the brake surfaces 92, whereby the tangent or pallet contacting plane 87 defined by the rollers 81 is hence spaced upwardly a small distance above the braking plane 89.

Conversely, when the rollerway 72 is in its lowered or non-activating position A, the deflation of the hose 76 causes sufficient lowering of the rollerway 72 such that the tangent or contact plane 87 defined by the rollers 81 is now disposed at an elevation no greater than and preferably slightly below the elevation of the brake surface plane 89 so that the rollers 81 no longer have effective load-bearing contact with the pallet legs 58.

In the present invention, the brake surface plane 89 is disposed so as to preferably be no higher than (i.e. coplanar with) the load supporting plane 65 defined by the load-supporting conveyor sections 61–62 and, in the preferred embodiment, the brake surface plane 89 is disposed parallel with but displaced a small distance below the load plane 65. Conversely, the contact plane 87 defined by the rollerway rollers 81, when the rollerway 72 is in its raised position B illustrated by FIG. 6, is disposed parallel with but spaced a small distance above the load plane 65. These positional relationships permit the overall conveying system 53, when operated, to utilize the load-induced vertical deflection of the center portion of the pallet so as to cause the bottom surface 99 of the center runner or legs 58 to be stationarily engaged with the brake surfaces 92 when the rollerway 72 is in the lowered position A so as to effect stationary positioning of the pallet, or conversely enables the rollers 81 acting at the contact plane 87 to contact the bottom surface 99 of the legs and effect upward deflection.

In operation, the loaded pallet 54 is positioned on the conveyor arrangement 51 at the input end, namely the rightward end in FIG. 3, whereupon the pallets are moved by gravity downwardly along the conveyor toward the rightward or output end. The leading palletized load, as positioned at the downward end of the conveyor, is retained by a stop, substantially as illustrated in FIG. 1. The leading palletized load can then be removed, when desired, by a fork lift or other removal device, following which the remaining pallets advance by gravity downwardly along the conveyor until the new leading load abuts the stop, and the subsequent palletized loads substantially sequentially abut one another.

Regarding the gravity-induced movement of individual loaded pallets downwardly along the conveyor, such movement preferably occurs by means of a series of small movement steps due to cyclic and repetitive inflation-deflation of hose 76 so that the loads are repeatedly raised and lowered. During the raised portion of each reciprocating cycle, the load is free to move downwardly by gravity due to the load being supported entirely by the rollers 63 and 81. During the lowered portion of each cycle, however, the lowering of the rollerway 72 causes the center runner or legs 58 of the pallet to engage the frictional brake surfaces 92 and thus effect stopping of the pallet and maintenance of the pallet in a stationary position so long as the rollerway 72 remains in its lowered position. During this stoppage of the loaded pallet, however, the side legs 56, 57 of the pallet remain in supportive engagement with the rollers 63 associated with the side conveyor sections 61 and 62.

Due to the articles (not shown) which are stacked on the deck 55 of the pallet 54, coupled with the construction of the pallet, the center portion of the pallet can vertically deflect relative to the side portions thereof. The center activating conveyor section 71, when used in conjunction with the support conveyor sections 61 and 62, preferably uses the deflection characteristic of the pallet so as to permit the loaded pallet to assume both the moving position illustrated by FIG. 6 and the stationary position illustrated by FIG. 4, even though the side legs 56–57 of the pallet always remain in supportive engagement with the rollers 63 of the side conveyor sections 61 and 62. The center activating conveyor section 71, due to the limited cyclic vertical displacement thereof as caused by cyclic inflation/deflation of the activating hose 76, during upward movement of rollers 81 effects load-bearing engagement with the center legs 58 so as to effect an upward displacement (i.e., deflection) of the center of the pallet 54, whereby the pallet is supported entirely by rollers 63 and 81 and hence can move downwardly along the rows of rollers due to the effect of gravity. Conversely, however, lowering of the rollerway 72 permits the loading on the pallet to effect downward vertical movement (i.e. deflection) of the center of the pallet so that the bottom surfaces of the center legs 58 hence move into engagement with the stationary brake surfaces 92, thereby effecting stoppage and stationary holding of the pallet 54 until the rollers 81 are again moved upwardly into load-bearing contact with the legs 58.

In the conveyor arrangement 51 of the present invention, the brake surface plane 89 is preferably disposed a small distance below the load bearing plane 65, and conversely the contact plane 87 defined when the rollers 81 are in the raised position of FIG. 6 is preferably slightly above the load bearing plane 65. This thus ensures that the center portion of the pallet is effectively deflected small amounts both above and below the normal straight or non-deflected position, and hence simplifies the deflection process. The actual amount of the deflection of the center portion of the pallet both above and below the contact plane 65 is shown as an exaggerated amount in FIGS. 4 and 6 for purposes of illustration and explanation, but it will be appreciated that the actual deflection between the raised and lowered positions will typically be in the range of about one-fourth inch, and for example may involve an upward deflection above plane 65 of about one-eighth inch when in the position illustrated by FIG. 6 and a downward deflection below plane 65 of about one-eighth inch when in the position of FIG. 4. It will be appreciated, however, that the actual magnitude of the deflection will vary based on the overall construction and geometry of the pallet, and of the conveyor system associated therewith, and that the entirety of the deflection may be positioned either above or below the load plane 65 defined by the side rollers 63.

Figure 7:
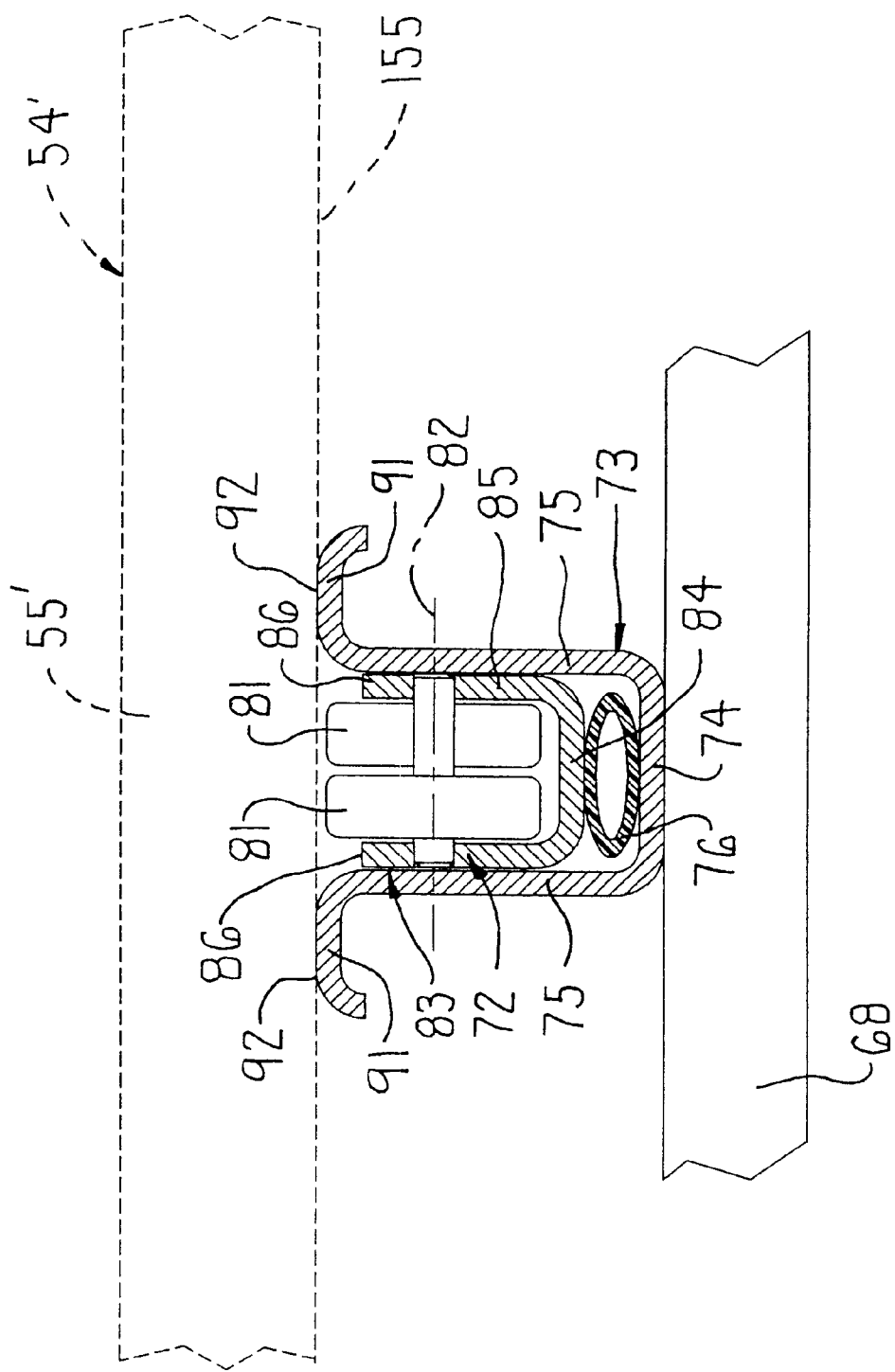
FIG. 7 is a view similar to FIG. 5 but showing a variation of the invention.

Referring to FIG. 7, there is illustrated a variation of the invention wherein the center conveying section 71' is not provided with upwardly projecting centering flanges, but the center section 71' and the rollerway 72 associated therewith is in all other respects identical to the conveyor section 71 described above. By eliminating the upwardly protruding centering flanges, the braking surfaces 92 are the uppermost extremity and hence permit direct frictional braking contact with the underside of a flat pallet 54', which pallet is typically of thin and somewhat flexible vertical construction and is not provided with downwardly projecting legs or runners. With this arrangement, the flat bottom surface 155 of the pallet deck 55' can directly engage the braking surfaces 92 along the longitudinal center of the pallet, whereas this same bottom surface 155 is disposed in supportive rolling engagement with the roller assemblies of the side conveyor sections 61, 62. Activation of the lifting device causes the rollerway 72 associated with center conveyor section 71' to lift upwardly and upwardly deflect the longitudinal center portion of the pallet 54' so as to permit downward advancing movement of the pallet along the conveyor in the same manner as described above relative to FIGS. 3–6.

Figure 2:
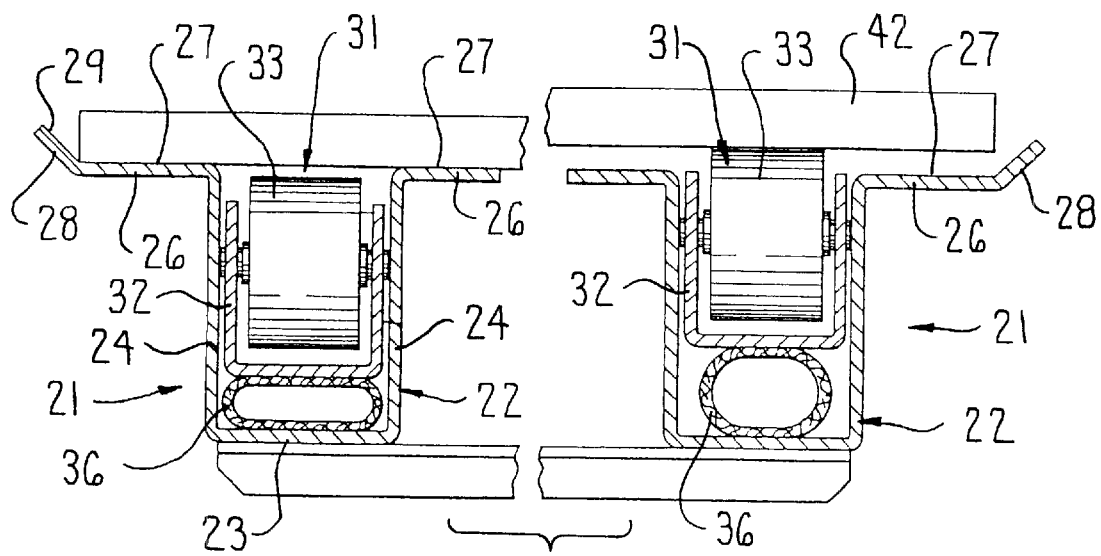
FIG. 2 is an enlarged fragmentary sectional view taken generally along line 2—2 in FIG. 1.

It will be further appreciated that the conveyor arrangement 51 of the present invention can be utilized either as a single conveyor, or as part of an overall storage rack employing multiple such conveyors disposed in vertically stacked relationship one above the other and/or multiple such conveyors disposed in sidewardly adjacent relationship, with the overall rack hence defining several sidewardly adjacent columns each having several conveyor bays disposed in vertically disposed relationship therein. Attention is directed to my earlier U.S. Pat. No. 4 304 521 which illustrates a storage rack having a plurality of conveyors constructed in accordance with the prior art of FIGS. 1 and 2 and arranged so that plural vertically-spaced storage conveyors are disposed within each of several sidewardly adjacent columns.

It will also be appreciated that, while use of a pneumatically-inflatable elongate hose 76 is a preferred embodiment of the cyclic lifting and lowering system to control movement of the rollerway 72, other mechanisms including mechanical linkages such as swinging levers or the like can be utilized for controlling the vertical reciprocating movement of the rollerway 72.

With the arrangement of the present invention, any failure of the lifting system will typically result in deflation of the hose 76, and hence will automatically result in lowering of the center portion of the pallet so as to ensure that the center legs 58 are moved into braking engagement with the brake surfaces 92, thus causing stoppage of the load so as to create what is commonly referred to as a fail-safe system.

In addition, if the palletized load tends to skew sidewardly during the advancing movement thereof along the conveyor, any excessive sideward movement is restrained by the sideward confinement of the center legs 58 between the centering flanges 93. Furthermore, when the center portion of the pallet is in the raised position illustrated in FIG. 6, and if it is sidewardly displaced, then the corner of the leg during lowering thereof may engage the upper sloped surface 93 defined on the centering flange 92 so that the latter applies a sideward displacement force against the leg and effectively moves the leg sidewardly to effect re-centering of the pallet.

While the pallet as described above is typically constructed of plastics material, it has been observed that pallets of similar construction as utilized in Europe may be constructed of wood. Such pallets, which are free of bottom decks, still experience deflection when subjected to loading and support in the manner disclosed herein, and hence are likewise usable with the improved conveyor arrangement of the present invention.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A gravity-type roller conveyor for controlled supportive movement of loaded pallets longitudinally therealong, comprising:
   an elongated stationary frame;
   first and second elongate load-supporting conveying assemblies mounted on said frame and respectively including first and second elongate roller assemblies extending longitudinally of said conveyor and disposed in sidewardly spaced but parallel relationship, each said roller assembly including a plurality of non-powered rollers disposed in spaced relation along a row which extends in the longitudinal direction with the rollers supported for rotation about horizontal axes which project transversely with respect to the longitudinal direction, the rollers of said first and second roller assemblies having upper surfaces disposed to define a declining load-contacting plane which extends at a small acute angle relative to the horizontal as it extends longitudinally of the conveyor so as to permit loaded pallets to be supported on the rollers and moved by gravity along the roller assemblies;
   an elongate activating conveying assembly positioned sidewardly between said first and second load-supporting conveying assemblies and extending longitudinally of said conveyor in spaced but parallel relationship to said first and second load-supporting conveying assemblies;
   said activating conveying assembly including an elongate roller arrangement extending longitudinally of said conveyor and including a plurality of non-powered rollers mounted for rotation about respective horizontal axes which extend transverse to said longitudinal direction, said rollers being spaced apart in the longitudinal direction and having upper surfaces disposed on a declining contact plane which extends generally parallel to said declining load-support plane;

said activating conveying assembly also including a lifting arrangement contacting between said frame and said elongate roller arrangement for causing vertical reciprocating movement of said roller arrangement between a raised position wherein the rollers thereof are in load-bearing contact with the loaded pallet to permit gravity-urged movement of the pallet along the conveyor and a lowered position wherein the rollers are not in significant load-bearing engagement with the loaded pallet; and a braking structure fixedly mounted on the frame and extending in the longitudinal direction of the conveyor and defining thereon an upwardly oriented braking surface positioned for direct engagement with the loaded pallet when the roller arrangement of the activating conveying assembly is in said lowered position;

whereby the loaded pallet is disengaged from the braking surface when the roller arrangement is in said raised position so as to permit gravity-induced movement of the loaded pallet downwardly along the conveyor.

2. A conveyor according to claim 1, wherein movement of said roller arrangement between said raised and lowered positions effects vertical deflection of the center portion of the pallet in the longitudinal direction of the conveyor between a raised position wherein a bottom center runner or leg on the pallet is engaged with the rollers of the roller arrangement and a lowered stationary position wherein an undersurface associated with the center portion of the pallet is frictionally engaged with the braking surface.

3. A conveyor according to claim 2, wherein the lifting arrangement includes an elongate flexible hose positioned under the roller arrangement and is coupled to an inflating/deflating control so as to effect cyclic inflation/deflation of the hose to effect cyclic raising and lowering of the roller arrangement.

4. A conveyor according to claim 3, wherein the frame includes an elongate upwardly-opening channel-like support having the roller arrangement confined therein for vertical displacement relative thereto, the inflatable hose being disposed vertically between a bottom wall of the roller arrangement and a bottom wall of the channel-like support, and said brake surfaces being defined by a pair of edge flanges which are fixed to upper edges of the side walls of said support and extend longitudinally therealong, said flanges projecting sidewardly away from the roller arrangement and defining thereon generally flat upper surfaces which define said braking surfaces.

5. A conveyor according to claim 4, wherein said pallet includes an enlarged platelike top deck on which articles are positioned, and a plurality of legs which are secured to and project downwardly from said deck, said legs including first and second rows disposed adjacent opposite sides of the deck and each including a plurality of legs aligned in the row in spaced relationship longitudinally of the conveyor, the legs of said first and second rows being maintained in supportive engagement with the roller assemblies of the respective first and second load-supporting conveying assemblies irrespective of the position of the activating conveyor assembly, and said pallet having a third row of legs which are spaced apart longitudinally of the conveyor and project downwardly from the deck sidewardly between the first and second rows, the legs of said third row being engaged with the roller arrangement when the latter is in the raised position and being engaged with the braking surfaces when the roller arrangement is in the lowered position.

6. A conveyor according to claim 1, wherein said pallet includes an enlarged platelike top deck on which articles are positioned, and a plurality of legs which are secured to and project downwardly from said deck, said legs including first and second rows disposed adjacent opposite sides of the deck and each including a plurality of legs aligned in the row in spaced relationship longitudinally of the conveyor, the legs of said first and second rows being maintained in supportive engagement with the roller assemblies of the respective first and second load-supporting conveying assemblies irrespective of the position of the activating conveyor assembly, and said pallet having a third row of legs which are spaced apart longitudinally of the conveyor and project downwardly from the deck sidewardly between the first and second rows, the legs of said third row being engaged with the roller arrangement when the latter is in the raised position and being engaged with the braking surfaces when the roller arrangement is in the lowered position.

7. A conveyor according to claim 6, wherein the displacement of the roller arrangement between the raised and lowered positions is about one-fourth inch.

8. A conveyor according to claim 6, wherein the braking surfaces define a braking plane which is substantially parallel to the declining load-supporting plane, and wherein the braking plane is positioned at an elevation so as to be substantially coplanar with or slightly below said load-supporting plane.

9. A conveyor for storing and advancing loads, such as loaded pallets, comprising:

first and second horizontally elongate conveyor sections extending longitudinally of the conveyor and disposed in sidewardly spaced but generally parallel relationship, each of said first and second conveyor sections including an elongate roller assembly which extends longitudinally along substantially the length of the conveyor and includes a plurality of non-powered rollers which define a generally upwardly-facing load supporting plane for said loads;

a third horizontally elongate conveyor section extending longitudinally of the conveyor and disposed sidewardly between and generally parallel with said first and second conveyor sections, said third conveyor section including an elongate roller arrangement which extends longitudinally along substantially the length of the conveyor and includes a plurality of rollers which have upper surfaces defining a load contacting plane which is positioned close to and generally parallel with said load supporting plane;

said third conveyor section including a lifting mechanism cooperating with the roller arrangement for effecting vertical displacement of the roller arrangement and of the load contacting plane defined thereby between raised and lowered positions which are vertically spaced a small distance apart;

a stationary brake structure extending in the longitudinal direction of the conveyor and positioned in sidewardly adjacent relationship to said third conveyor section, said brake structure being positioned sidewardly between said first and second conveyor sections, said brake structure defining thereon a stationary upwardly-facing braking surface;

whereby a load when positioned on the conveyor has opposite edge portions supportingly engaged with the roller assemblies of the first and second conveyor sections and has a center portion which is engaged with the brake surface when the roller arrangement of the third conveyor section is in the lowered position, and whereby the center portion of the load is engaged by the roller arrangement of the third conveyor section when the roller arrangement is in the raised position.

10. A conveyor according to claim 9, wherein the first, second and third conveyor sections are all sloped downwardly at a small acute angle relative to the horizontal from an input end to an output end and permit gravity-induced movement of loads therealong when the roller arrangement of the third conveyor section is in the raised position while effecting stationary positioning of the load when the roller assembly of the third conveyor section is in the lowered position.

11. A conveyor according to claim 9, wherein the load comprises a pallet having a top deck on which articles are positioned, said pallet having a center portion which extends in the longitudinal direction of the conveyor and deflects vertically relative to the pallet edge portions in response to the raising and lowering movement of the roller arrangement associated with the third conveyor section.

12. A method of storing and forwardly advancing loaded pallets on a roller-type gravity conveyor having first and second roller assemblies which are elongated longitudinally along the conveyor and slope downwardly at a small declining angle relative to the horizontal and are disposed in generally parallel but sidewardly spaced relationship, comprising the steps of:

providing a loaded pallet having a load-supporting deck having first and second edge portions adjacent opposite sides thereof and a center portion therebetween;

positioning said pallet on said conveyor so that said first and second edge portions are respectively disposed in supportive engagement with the respective first and second roller assemblies;

providing a third roller assembly sidewardly between and generally parallel with said first and second roller assemblies and positioned for vertical cooperation with the center portion of the pallet;

providing a stationary braking surface positioned adjacent said third roller assembly and extending longitudinally of the conveyor with said braking surface being positioned for engagement with a bottom surface defined on the center portion of the pallet;

effecting vertical up-and-down movement of the third roller assembly through a small vertical distance between (1) a raised position wherein the third roller assembly is in rolling load-supporting engagement with said center portion of the pallet and the center portion is displaced vertically out of engagement with the braking surface, and (2) a lowered position wherein the center portion of the pallet is in direct engagement with the braking surface to positionally control movement of the pallet along the conveyor.

13. A process according to claim 12, wherein moving of the third roller assembly from the lowered position to the raised position causes the center portion of the pallet to be deflected upwardly while maintaining the edge portions in supportive engagement with the first and second roller assemblies, and wherein lowering of the third roller assembly into said lowered position permits the center portion of the pallet to deflect downwardly into engagement with the braking surface while permitting the edge portions to remain in engagement with the first and second roller assemblies.

14. A process according to claim 11, wherein the edge and center portions of the pallet are each defined by a downwardly protruding runner which extends lengthwise of the pallet in the longitudinal direction of the conveyor.

15. A process according to claim 11, wherein each of the edge and center portions is defined by a plurality of discrete downwardly-projecting leg members which are disposed in spaced relationship within a row which extends in said longitudinal direction.

* * * * *